Oct. 6, 1959 W. M. BARKER ET AL 2,907,982

CENTRALIZED TRAFFIC CONTROL SYSTEM FOR RAILROADS

Filed July 10, 1953

2 Sheets-Sheet 1

INVENTORS.
W. M. BARKER AND
L. BROCKMAN

BY Forest B. Hitchcock
THEIR ATTORNEY

CENTRALIZED TRAFFIC CONTROL SYSTEM FOR RAILROADS

Filed July 10, 1953

INVENTORS.
W.M.BARKER AND
L. BROCKMAN
BY Forest B. Hitchcock
THEIR ATTORNEY

United States Patent Office 2,907,982

Patented Oct. 6, 1959

2,907,982

CENTRALIZED TRAFFIC CONTROL SYSTEM FOR RAILROADS

William M. Barker, Scottsville, and Lyle Brockman, Rochester, N.Y., assignors to General Railway Signal Company, Rochester, N.Y.

Application July 10, 1953, Serial No. 367,325

6 Claims. (Cl. 340—163)

This invention relates to centralized traffic control systems for railroads and more particularly pertains to an electronic power supply and electronic impulse detector for use in the control office apparatus of a centralized traffic control system.

In centralized traffic control systems, the control of switches, signals, and other devices at remote field stations is accomplished from a central location, usually termed a control office, by transmitting distinctively coded electrical currents over a pair of line wires to the field stations. Information regarding the actual operated conditions of the various devices at each field station, or an "indication" as it is commonly called, is generally transmitted over the same line wires carrying the controls, and these indications are also usually transmitted in the form of distinctively coded electrical currents.

In one such type of centralized traffic control CTC system, a continuous pair of line wires extends from the control office to the various field stations. At the control office, a power source, usually a battery, is provided for energizing the line wires, along with apparatus for causing the line energization to be distinctively coded for the transmission of control codes. At each field station, a line relay is connected across the line wires, and this line relay responds to the distinctively coded currents placed on the line wires at the control office. Apparatus is also provided at each field station to intermittently shunt the normally energized line wires in a distinctive code pattern according to the particular indication codes that are desired to be transmitted back to the control office. Each shunting of the line wires at the field station causes an increase of line current between the control office and the transmitting field station, and apparatus is provided at the control office for detecting these current variations so as to make it possible for the incoming messages from the field stations to be properly received. A shunt-type system of this kind is shown in the Patent No. 2,399,734 to W. D. Hailes et al., dated May 7, 1946.

The characteristics of a power supply system comprising a battery as is normally used in such shunt type centralized traffic control system, are such that it is, under certain circumstances, difficult to receive indications from remote field station locations. This difficulty arises particularly from the fact that a current limiting resistor is required to be inserted in series with the battery at the control office. This resistor limits the line current to a value that will prevent damage to relay contacts when a shunt is applied across the line wires at or near the control office since, under these circumstances, the low line resistance between a battery and the shunt would otherwise cause an extremely high level of current.

The use of a current limiting resistor in series with the line battery causes, however, a reduction in the voltage on the line wires whenever the line is shunted at a field station. In other words, the reduced resistance load across the line wires that occurs when a shunt is applied causes the current drawn from the battery to increase. The increased voltage drop that then results across the current limiting resistor and also across the battery's internal resistance causes the line voltage to drop with the result that only a limited current increase is produced by the field station shunt. Consequently, for remote field stations where there is in addition a considerable voltage drop in the line wires when a shunt is applied, the current differential at the control office becomes so small that its detection is difficult.

Another disadvantage of such a power supply employing a battery and series current limiting resistor is that the line voltage varies considerably with line leakage conditions in such a way as to impair proper operation of the system. A high value of leakage current such as occurs under conditions of damp weather, causes the voltage applied to the line wires to be reduced. Even without this reduction in line voltage, a condition of high line leakage tends to reduce the operating current for the line relays of remote field stations. This situation is aggravated if there then occurs a drop in the line voltage which decreases even further the current available to operate the line relays.

To overcome these drawbacks in the use of a battery for the energization of the line wires of a centralized traffic control system, it is proposed according to this invention to provide an electronically controlled power supply which supplies a higher voltage to the line wires in response to an increase of current drawn from the power supply. In this way, the application of a shunt by a field station causes the line wire voltage to increase in response to the increased line current resulting from the shunt and to decrease when the shunt is removed and the line current decreases. As a result, a greater line current differential occurs to facilitate the detecting of field station shunts at the control office.

Another advantage provided by the electronically controlled power supply of this invention is that such a power supply causes the line voltage to increase automatically when conditions of high line leakage exist and to decrease when there is low line leakage present so as to provide automatic compensation for existing line conditions. Also, to overcome the need for a current limiting resistor, the electronically controlled power supply is so organized that any attempt to draw a level of current in excess of some predetermined value results in a relatively sharp drop of line voltage so as to limit the upper level of line current. This current limiting feature also permits the use of a higher line voltage since the current is at all times prevented from reaching an excessive value.

The means which has been provided in prior centralized traffic control systems for the detection of field station shunts at the control office has generally comprised an impulse transformer. This transformer has its primary winding connected in series with the source of line power and its secondary winding connected to the winding of a polar code-following relay. As the line current increases in response to a field station shunt and then decreases again as the shunt is removed, voltage pulses successively of one polarity and then the other appear across the secondary winding, causing the relay to be operated between its opposite conditions.

One disadvantage resulting from the use of an impulse transformer is that a relatively high change of line current must occur to cause the code-following relay to be actuated. This requirement has, in the past, often dictated the use of large line wires to overcome line voltage drop and has limited the maximum distance between the control office and the most distant field station. It is, therefore, also proposed according to this invention to provide electronic impulse detection apparatus at the control office which will respond to field station shunts resulting in only small current differentials at the control office.

In a centralized traffic control system, it is often desirable to provide communication, not only with the field stations connected to the main centralized traffic control system line, but also with field stations associated with a branch line connected to the main line. Such a branch line may be connected to the line at the control office or, more commonly, at some point remote from the control office.

Under these circumstances, it is often not possible to ensure that the application of a shunt by a field station on the main CTC line beyond the junction will cause the release of line relays on the branch line or vice versa. As described in the previously mentioned patent of W. D. Hailes et al., such releasing of the line relays is required to obtain a predetermined superiority among stations in the event that two or more stations start simultaneously to transmit indication codes to the control office. Therefore, it is also proposed according to this invention to provide means for so coordinating the electronic power supply and the electronic impulse detector of this invention when desired, as in branch line operation, that the detection of a field station shunt by the impulse detector will result in an abrupt lowering of the line voltage throughout the duration of such shunt, thereby causing all of the line relays to drop away. It is contemplated that the rising voltage with rising current characteristics of the power supply will still be effective so as to facilitate both the detection of a shunt and the removal of a shunt by a field station. Once the shunt condition is detected, however, it is proposed that the power supply cause the line voltage to decrease to some lower level which will ensure the dropping away of all the line relays at the field station but will at the same time be high enough to permit detection of the removal of shunt at the transmitting field station location.

It is, accordingly, one object of this invention to provide an electronically controlled power supply for a centralized traffic control system which will be so organized as to have a rising voltage with rising current characteristic to facilitate the indication of remote line shunts and to compensate for variations in line conditions.

It is another object of this invention to provide an electronically controlled power supply that incorporates a rising voltage with rising current characteristic and which is also effective to limit the maximum current that can flow in the event that a shunt is applied at or near the control office.

An additional object of this invention is to provide an electronic impulse detector which provides a sensitive means for detecting field station shunts.

Another object of this invention is to provide an electronically controlled power supply and electronic impulse detector for a centralized traffic control system cooperating in such a manner as to cause the release of the line relays of inferior field stations in response to the application of a line shunt by a simultaneously transmitting superior field station.

Another object of this invention is to provide an electronically controlled power supply and electronic impulse detector for a centralized traffic control system wherein the detection of a field station shunt by the impulse detector results in a lowering of the line wire voltage by the power supply for the duration of such shunt to insure thereby the releasing of line relays of other field stations associated with said line wires.

Other purposes, characteristics and features of this invention will in part be obvious from the accompanying drawings and in part pointed out as the description of the invention progresses.

In describing this invention in detail, reference will be made to the accompanying drawings in which like reference characters designate corresponding parts in the several views and in which.

To simplify the illustration and facilitate the explanation of this invention, the various parts and circuits are shown diagrammatically and conventional illustrations have been used. The drawings have been made to make it easy to understand the principles and manner of operation rather than to illustrate the specific construction and arrangement of parts that would be used in practice. The various relays and their contacts, for example, are shown in a conventional manner.

Described briefly, the present invention comprises a power supply that is electronically controlled to have predetermined characteristics with respect to the manner in which its output voltage varies with respect to output current and with respect to fluctuations in the input voltage. This power supply is particularly adapted for energizing the line wires of a centralized traffic control system. The circuit organization is effective to cause the output voltage of the power supply to be substantially unaffected by variations of the input voltage but to vary with output current in such a manner that the voltage rises when the output current rises and decreases when the output current decreases. Furthermore, the power supply is controlled in such a manner that an increase of load tending to cause an output current of the power supply in excess of some predetermined maximum value results in a rapid lowering of the output voltage, thereby effectively limiting the maximum current that can be drawn from the power supply.

The present invention also comprises an electronic impulse detector that is responsive to variations in voltage occurring across a resistor carrying through it the current supply to the line wires. As line shunts are applied and removed at the various field stations, the voltage across this resistor increases and decreases accordingly. This voltage is amplified in the impulse detector and is effective to cause an electronic flip-flop circuit organization to be operated successively between opposite conditions with the result that an associated relay is also actuated from one condition to the other.

Figure 1:
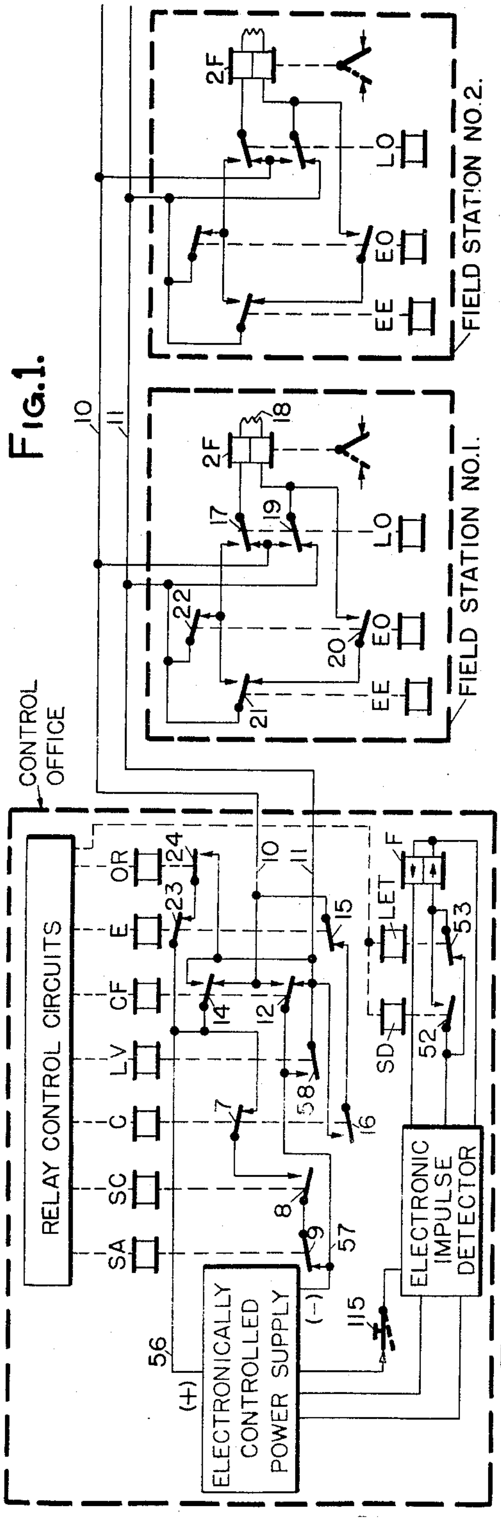
Fig. 1 illustrates a portion of a centralized traffic control system having control office apparatus that includes the electronically controlled power supply and electronic impulse detector of this invention.

Fig. 1 diagrammatically illustrates the line circuit for a centralized traffic control system of the kind that may be used in conjunction with the apparatus of this invention. A shunt type CTC system of this kind is shown in the previously mentioned Hailes et al. patent. The line circuit of Fig. 1 is a modification of that shown in Fig. 1 of this patent, but the various control office relays, indicated as being operated by appropriate relay control circuits, are all controlled in the manner shown and described in this prior patent.

At the control office, control codes are applied to the line wires 10 and 11 and are transmitted to a plurality of field stations, each of which is located along the railroad at a point where switches, signals, or other devices are to be controlled. Each field station comprises means for responding to a control code designated for it and is effective to decode the information received so as to selectively control the device at that field station location in the required manner.

Each field station also comprises means for selectively shunting and unshunting the line wires. Since the line wires are normally energized by the power supply provided at the control office, the act of shunting and unshunting the line wires at a field station causes code pulses of current to appear on the line wires. In this way, indication codes bearing information as to the operated conditions of the various devices at the field station are transmitted back to the control office.

In Fig. 1, which illustrates in block form one embodiment of this invention, it is shown that the line wire 11 is normally connected through a back contact 12 of relay CF to the negative output terminal of the electronically controlled power supply. The other line wire 10 is connected through back contact 14 of relay CF to the positive output terminal of the power supply. Thus, when the system is at rest, the power supply is connected across the line wires so that the line wires are normally energized and with wire 10 of positive polarity as compared to wire 11.

At each field station, the LO relay is dropped away during a period of rest. Line wire 10 is thus connected through back contact 17 of relay LO, the upper winding of relay 2F, resistor 18, and back contact 19 of relay LO, to the line wire 11. The 2F relay at each field station is a two-position biased polar relay. During a period of rest, when the flow of current through the upper winding of relay 2F is from left to right, the armature of this relay assumes its right-hand position. If the polarity of current through the windings of relay 2F is either interrupted or reversed, the armature of relay 2F moves to its left-hand position.

Means are provided at the control office to cause line wires 10 and 11 to be alternately energized and deenergized for short and long periods during a control cycle to form distinctive control codes. The picking up of relay C at the beginning of a control cycle causes the line wire 10 to be connected through back contact 15 of relay E and front contact 16 of relay C, to line wire 11. This shunting circuit causes the line wires 10 and 11 to be deenergized so that the line relays at the various field stations will all be dropped away. This indicates to the various field stations that the control office is about to begin the transmission of a control cycle. This shunt circuit also short-circuits the output of the electronically controlled power supply. The output current of the power supply thus increases but, as will presently be shown, the maximum current that can be drawn from the power supply under these conditions is limited to a safe value.

For the remainder of the control cycle, relay C remains picked up but relay E is alternately picked up and dropped away in accordance with the control code that is desired to be transmitted. When back contact 15 of relay E is opened, the shunt circuit is open and the line wires 10 and 11 are then energized by the output of the electronically controlled power supply. At the same time, the current supplied by the power supply is decreased. When relay E drops away and closes its back contact 15, the line wires 10 and 11 are again shunted and the output current of the power supply is increased. As a result of this alternate energization and deenergization of the line wires 10 and 11, the line relay 2F at each field station is successively operated between its opposite conditions.

At the same time, each current change in the line wires as the power supply is intermittently shunted and unshunted causes corresponding changes to occur in the voltage across a resistor included in the electronically controlled power supply. This voltage is effective, through the electronic impulse detector, to operate the relay F between its opposite conditions. This relay F is a two-position polar type relay. Its armature is operated to one position by a particular polarity of energization and to the other position by the opposite polarity.

During the clearout period which comes at the end of a control cycle, relay C drops away. Although the line wires are intended to be shunted during a clearout period with relay E dropped away, the opening of front contact 16 as relay C drops away would ordinarily cause the shunt to be removed. Such a shunt removal is prevented at this time by an alternate shunt circuit provided through back contact 23 of relay E and back contact 24 of relay OR.

The alternate shunting and unshunting of the line wires at the control office during a control cycle causes the line relay 2F at each field station to be operated between its opposite conditions. This operation of the 2F relay is effective on associated decoding apparatus to select the desired station and control the apparatus at that station according to the code received.

At the beginning of an indication cycle, the relay CF at the control office is picked up in response to the shunting of the line wires at the transmitting field station. Line wire 10 is, therefore, connected through front contact 12 of relay CF to the negative terminal of the power supply, whereas, the line wire 11 is connected through front contact 14 of relay CF directly to the positive output terminal of the power supply. This reversal of polarity of the line wires results in actuation of the relay 2F at each field station so that the relay LO at the transmitting field station is picked up in a manner described in the above mentioned patent to W. D. Hailes et al. The picking up of the relay LO at any field station designates that field station as the one to transmit an indication code to the control office.

When the relay LO at a field station is picked up, the subsequent intermittent operation of the relay EO causes a shunt to be applied across the line wires 10 and 11. This shunt circuit extends from line wire 10, and includes front contact 19 of relay LO, front contact 20 of relay EO, and back contact 21 of relay EE, to the line wire 11. At the same time, relay 2F at the transmitting field station is dropped away because of the shunt applied at that location and also because of the opening of back contact 22 of relay EO which is included in the pick-up circuit of relay 2F when relay LO is picked up.

Each code digit characterized by the shunting of the line wires is terminated by the picking up of relay EE. The picking up of relay EE causes its back contact 21 to open so that the shunt path just described is no longer effective. At the same time, the closure of front contact 21 of relay EE causes the line wires to be connected across the windings of the line relay 2F. This circuit for the energization of the relay 2F extends from the now positive line wire 11 and includes front contact 21 of relay EE, front contact 17 of relay LO, the windings of relay 2F, resistor 18, and front contact 19 of relay LO to the negative line wire 10. Thus, it is seen that the shunting of the line wires at the field station causes the associated line relay to drop away, but that removal of the shunt causes the energized wires to pick up the line relay at that location. In this way, the line relay follows the code transmitted from the field station to thereby allow a local stepping operation.

At the control office, each current change in the line wires occurring in response to the coded message applied to the line wires at a field station produces a corresponding change in the voltage across a resistor included in the electronically controlled power supply. This voltage is effective, through the electronic impulse detector, to operate the relay F between its opposite conditions.

It will be noted that a front contact 52 of relay SD and a back contact 53 of relay LET are included in parallel in the energizing circuit for the lower winding of relay F. The purpose of these contacts is to prevent an erroneous operation of relay F from occurring when the line wires are pole changed at the beginning of an indication cycle by the picking up of relay CF. When a transmitting field station first applies a line shunt at the beginning of an indication cycle, the gas discharge tube 104 is fired so that the upper winding of relay F is energized as will later be described in detail. In the following interval, before the field station shunt is removed, the relay CF at the control office is picked up so as to reverse the polarity of energy applied to the line wires 10 and 11. This pole changing of the line wires results in current changes which would ordinarily tend to make the gas discharge tube 102 conductive so as to extinguish the gas tube 104 with the result that the lower winding rather than the upper winding of relay F would be energized. During this interval, however, relay SD is dropped away and relay LET is picked up. Thus, the circuit for the lower winding of relay F is opened as is also the plate-cathode circuit of tube 102 so that it cannot respond to the spurious input it receives when the line wires are pole changed. Although the tube 104 may, during such pole changing, also have a spurious input applied to its control grid, such input cannot affect this tube since it is already conductive and cannot, furthermore, be made non-conductive by such grid input voltage. Thus, the relative conducting and non-conducting conditions of tubes 104 and 102 are maintained during this interval and the relay F is not affected.

During the clearout period coming at the end of an indication cycle, a shunt is maintained on the power supply after relay SA drops away through back contact 7 of relay C, front contact 8 of relay SC, and back contact 9 of relay SA. This shunt circuit prevents the occurrence of a momentary variation in power supply current as the CF relay is dropped away and the armature of this relay moves to its dropped away position. Such a current variation would provide an erroneous input to the impulse detector as will later become clear. After relay CF drops away, the shunt is maintained through back contact 23 of relay E and back contact 24 of relay OR until relay OR again picks up to start the period of rest. As can be seen, this shunt circuit is not effective throughout the indication cycle when relay CF is picked up. When relay LV picks up at the end of an indication cycle, a shunt on the line wires is provided through its front contact 58 and front contact 12 of relay CF, thereby ensuring that the transmitting field station is retired.

When the system is at rest, the load on the power supply at the control office includes, principally, the series resistance of the line wires, the leakage resistance, and the various line relays shunting the line, one of which is located at each field station.

When a shunt is applied near the control office, the total resistance across the line wires as seen at the control office may be very low so that the current drawn from the power supply increases greatly. It is thus required that means be provided to limit the maximum current that can be drawn from the power supply so as to prevent damaging relay contacts at the control office location.

When the shunt is applied at a location remote from the control office, however, the reduction in resistance across the line wires as seen at the control office may be rather slight because there is then, between the control office and the shunt location, still considerable line resistance and leakage conductance in addition to a plurality of line relays at the various field stations. Thus, a shunt at a remote location produces a substantially smaller current differential than does a shunt applied near the control office. It is for this reason that the electronically controlled power supply of this invention is organized so as to cause a higher voltage to be applied to the line wires when the line current increases in response to the application of a field station shunt. In this way, an increased current differential occurs at the control office between shunt and nonshunt conditions to facilitate the reception of indication codes.

Figures 4, 5:
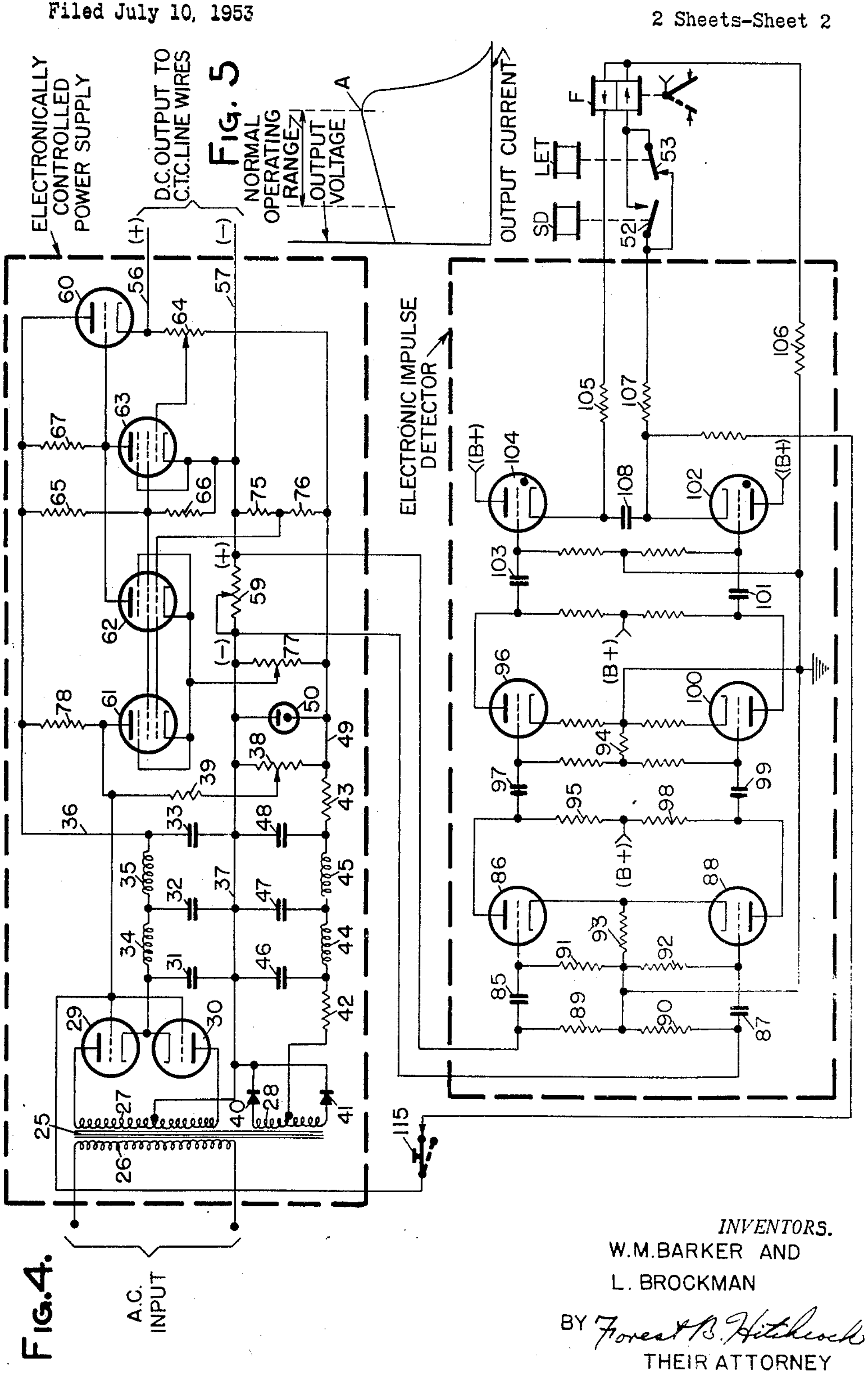
Fig. 4 illustrates the circuit diagram of both the electronically controlled power supply and the electronic impulse detector of this invention.
Fig. 5 illustrates graphically the output characteristics of the electronically controlled power supply of this invention.

*Electronically controlled power supply.*—The electronically controlled power supply is shown in Fig. 4 as including a power transformer 25 whose primary winding 26 is connected to a source of alternating current. A high voltage secondary winding 27 is provided, and it is the rectified output of this winding that energizes the line wires of the CTC system. A lower voltage secondary winding 28 is also provided to supply a source of negative bias voltage.

Full-wave rectification of the voltage appearing across the terminals of the secondary winding 27 is provided by the tubes 29 and 30 which are triode tubes having their plate electrodes connected to opposite terminals of the winding 27 and their cathodes connected through filter circuit elements to the center tap of the winding 27. The grids of tubes 29 and 30 are both connected to the plate of tube 61 and through resistor 39 to the tap on potentiometer 38 connected between wires 37 and 49. The voltage divider thus formed causes a voltage to be applied to the grids of tubes 29 and 30 that is negative with respect to the cathode voltage of these tubes. Tube 61 is normally in a substantially cutoff condition so that there is no voltage drop across resistor 78 resulting from the plate current of tube 61. Under these conditions, resistors 78 and 39 and potentiometer 38 form a voltage divider which causes the desired negative grid-cathode voltage to be applied to tubes 29 and 30, and with the amplitude of this bias voltage being established by the setting of potentiometer 38. Means is provided for automatically varying the bias voltage of the control grids of these tubes 29 and 30 with respect to the cathode voltage so as to vary the level of the rectified output of these tubes as will later be described in detail.

The capacitors 31, 32, and 33 and inductors 34 and 35 provide the required filtering of the rectified output of tubes 29 and 30 with the result that there appears between the wires 36 and 37 a direct voltage whose amplitude is dependent upon the grid-cathode bias provided for rectifier tubes 29 and 30, and whose polarity causes wire 36 to be positive with respect to wire 37.

Full-wave rectification of the voltage appearing across transformer winding 28 is provided by the rectifiers 40 and 41 which may be of any desired type such as copper oxide, selenium, or electron tube rectifiers. Filtering of the rectified output voltage is provided by the resistors 42 and 43, inductors 44 and 45 and the capacitors 46, 47, and 48. The polarity of the rectifiers 40 and 41 is so chosen that wire 49 is of negative polarity with respect to the wire 37. The voltage regulator tube 50 connected between these two wires tends to maintain this negative bias voltage at a uniform level.

Wire 37 is connected to the output wire 57 of the power supply through resistor 59. The positive wire 36, on the other hand, is connected through the plate-cathode circuit of tube 60 to the other output wire 56. The resistor 59 is of a fairly low value so that the voltage drop appearing across this resistor as a result of the flow of line current through it is correspondingly small. The resistance offered by the plate-cathode circuit of tube 60, however, is considerably greater. The effective magnitude of this plate-cathode resistance may be varied by changing the grid-cathode bias of the tube, and in this way the output voltage of the power supply appearing between wires 56 and 57 is varied in the manner desired.

It may be said, in general, that tubes 61, 62, and 63 together respond to variations in load appearing across the line wires, to variations in the input voltage, and to the magnitude of current supplied to the load and that these tubes then control both the grid-cathode bias of the rectifier tubes 29 and 30 and the grid-cathode bias of the tube 60 so as to produce the desired characteristics of the power supply of this invention.

The grid-cathode circuit of tube 63 comprises a portion of the potentiometer 64 as selected by the position of the tap on this potentiometer, the voltage regulator tube 50 connected across the bias voltage supply, and the variable resistor 59 which is included in series with the wire 57 and thus carries through it the entire current supplied to the CTC line.

As already described, the output characteristics of the power supply of this invention are such that the output voltage should increase with an increase in current applied to the line wires. Accordingly, the minimum voltage applied to the line wires occurs when the line current is at its preselected minimum value. For this reason, the tap on the potentiometer 64 is adjusted, when the output current is at the minimum value, to provide the desired minimum voltage to the line wires. Under these circumstances, the portion of the positive output voltage which is selected by the position of the tap on the potentiometer 64 almost counter-balances the negative fixed voltage appearing across the voltage regulator tube 50 plus the fairly small level of voltage then appearing across resistor 59. The adjustment of the potentiometer for this condition results in a grid-cathode voltage for tube 60 which is slightly negative and provides the desired operating bias for this tube.

Tube 63 is preferably a high-gain, pentode-type of tube. Its suppressor grid is connected to its cathode, and its screen grid is connected to the junction of resistors 65 and 66 connected between wires 56 and 57 to provide the desired screen grid voltage for the tube. The plate of tube 63 is connected through load resistor 67 to wire 36. The plate voltage of this tube 63 is applied directly to the control grid of tube 60.

The conduction of plate current for tube 63 through its load resistor 67 in accordance with its normal bias voltage as provided by the setting of the potentiometer 64 reduces the plate voltage to a level that provides a slightly negative grid-cathode voltage for tube 60. This grid-cathode voltage level of tube 60 results in a corresponding value of plate-cathode resistance which determines the voltage drop appearing across the plate-cathode circuit. In other words, a condition of stability is arrived at under which the output level of voltage applied to wires 56 and 57 regulates the level of conduction of tube 63 which controls the grid bias of tube 60, which in turn controls the voltage drop across this tube and thus the output voltage of the power supply.

In the event that the output voltage varies in some manner such as by a variation in the amplitude of the input voltage applied to the power supply, the grid-cathode bias of tube 63 will be varied in such a way as to compensate for this variation in input voltage so that the output voltage will tend to remain at approximately its prior level. If, for example, the output voltage should rise, there will then be an increase of voltage on the grid of tube 63 so that this tube will conduct more plate current. Its plate voltage will then be lowered and the resulting increased negative bias on tube 60 will increase the effective plate-cathode resistance of this tube. Consequently, there will be a greater voltage drop through this tube and thus a decrease of voltage between wires 56 and 57 so as to restore this voltage to its prior value.

If the output load current supplied to a load on the wires 56 and 57 by the power supply is increased, the voltage drop across the variable series resistor 59 will increase. The polarity of this voltage drop is as indicated in Fig. 4. This polarity is such that it tends to make the control grid of tube 63 more negative with respect to its cathode. In other words, the greater the amplitude of current supplied to the load, the greater is the voltage drop across this resistor 59 and the greater is the amount by which the control grid of tube 63 is made negative with respect to its cathode. Making the grid of tube 63 more negative with respect to its cathode causes this tube to conduct less plate current. The reduced voltage drop across its plate resistor 67 causes an increase of voltage on the grid of tube 60. The plate-cathode resistance of this tube 60 is thus effectively decreased so that there is a lower voltage drop appearing across this tube with the result that the output voltage is increased. The amount by which the grid voltage of tube 60 is increased with increasing output current of the power supply is dependent upon the magnitude of the variable series resistor 59 so that the magnitude of this resistor 59, in effect, determines the amount by which the output voltage rises with increasing output current.

The rise of output voltage with rise of output current must necessarily be limited to a value that will not cause the action just described to become cumulative. The rise of voltage must be proportionately less than the current increase causing it, otherwise the voltage rise will cause a further rise of current which will increase the current even further, and so on.

Tubes 61 and 62 are both responsive to the amplitude of the line current and are effective to cause the line voltage to be reduced when the line current tends to exceed a predetermined maximum value.

The grid-cathode circuit of both tubes 61 and 62 includes the series line resistor 59. More specifically, the grid-cathode circuit of these tubes extends from the junction of resistors 75 and 76, through resistor 75, through the variable line resistor 59, through a portion of the potentiometer 77, to the cathodes of these tubes. When the line current is below the preselected maximum value, the grid-cathode voltage provided by the circuit described causes the tubes 61 and 62 to be substantially cut off. When the line current reaches a high level, however, the increased voltage drop across the series line resistor 59 causes an increase in the grid voltage for both tubes 61 and 62 so that these tubes begin to conduct plate current. The increased voltage drop that then results through the resistor 67 causes the grid-cathode voltage of tube 60 to be reduced. This results in an increase in plate-cathode resistance of tube 60 so as to cause a reduction in the voltage applied to line wires 56 and 57.

At the same time, the increased conduction of tube 61 also causes a drop in its plate voltage because of an increased voltage drop through the plate resistor 78. As a result, the voltage applied to the control grids of tubes 29 and 30 is reduced. These tubes thus have their apparent plate-cathode resistance increased with the result that there is a reduced flow of plate current in response to the alternating voltage applied between the cathode and plate of each tube. As a result the output voltage appearing between wires 36 and 37 is reduced. Thus, both by a decrease in grid voltage of the rectifier tubes 29 and 30 and a decrease of grid voltage of tube 60 is the apparent resistance of these tubes increased so as to cause the output voltage appearing on wires 56 and 57 to be reduced.

The approximate manner in which the output voltage of the power supply varies with variations in the current supplied to the line wires is illustrated graphically in Fig. 5. The output voltage is shown as increasing in a somewhat linear manner as the output current increases until some preselected high value of current is reached as at point A. When the output current tends to increase beyond this value, the output voltage decreases rapidly so as to limit the amplitude of current drawn from the power supply.

*Electronic impulse detector.*—The electronic impulse detector responds to the changes in voltage appearing across the series line resistor 59. These voltage changes are amplified in a push-pull amplifier, and the output of this amplifier causes the relay F to be alternately actuated between its opposite conditions.

The positive terminal of the resistor 59 is connected through capacitor 85 to the grid of tube 86. The other terminal of the series resistor 59 is connected through a corresponding capacitor 87 to the control grid of tube 88. The resistors 89 and 90 are connected in series across the series line resistor 59, and the junction of these resistors is connected to ground. The control grid of each of the tubes 86 and 88 is connected also through a grid leak resistor 91 and 92, respectively, to ground. Each tube 86 and 88 has is cathode connected through a common cathode resistor 93 to ground, with this cathode resistor providing the required self bias.

When the application of a shunt by a field station causes an increase of current in the line wires, the voltage drop across resistor 59 is increased so that the right-hand terminal of this resistor becomes more positive with respect to the left-hand terminal. As a result, an increase of voltage with respect to ground is applied to the control grid of tube 86, and at the same time, a voltage decrease appears at the control grid of tube 88. Tube 86 momentarily conducts an increased amount of plate current so that its plate voltage is reduced because of the increased voltage drop across its plate load resistor 95. A positive-going voltage variation is, therefore, applied to the control grid of tube 96 through capacitor 97. The reduced voltage drop across the plate load resistor 98 of tube 88 resulting from its negative-going input causes an increase of voltage to be applied through capacitor 99 to the control grid of tube 100.

The tubes 96 and 100 are connected in substantially the same manner as provided for the tubes 86 and 88. Thus, the decrease of voltage at the grid of tube 96 resulting from the application of a field station shunt causes an increase of plate voltage for this tube. Likewise, the positive-going voltage variation at the grid of tube 100 causes the plate voltage of this tube to be reduced. The voltage decrease effective through capacitor 101 on the control grid of the gas discharge tube 102 has no effect on the conduction of this tube. The positive voltage variation applied through capacitor 103 to the control grid of gas discharge tube 104 causes this tube to fire, however. As a result, there is a flow of plate-cathode current of tube 104 through resistor 105, the upper winding of relay F the resistor 106, and the control contacts, to ground. This energization of the upper winding of relay F causes its armature to be operated to the clockwise position as indicated by the arrow associated with this winding.

Upon the removal of a shunt by the field station, the voltage drop across series line resistor 59 is decreased. By analogy with the description already given, it will be understood that this voltage decrease results in a negative-going voltage variation being applied to the control grid of gas discharge tube 104, and a positive-going voltage variation being applied to the control grid of gas discharge tube 102. With tube 104 now in a conductive condition, there is a voltage drop across resistor 106 which has the effect of raising the cathode potential of tube 104 so as to provide a negative grid-cathode biasing voltage. This bias voltage maintains the tube 102 normally in a nonconductive condition. In a similar manner, tube 104 is biased to a nonconductive condition by the voltage drop across this resistor 106 when the other gas discharge tube 102 is conductive.

The positive voltage variation appearing on the control grid of tube 102 when a field station shunt is removed causes the negative bias on this tube to be overcome so that it is fired. As a result, there is a flow of current through resistor 107, the lower winding of relay F, resistor 106, and the control contacts to ground causing the lower winding of relay F to be energized. At the same time, there is a momentary increase of current through the plate-cathode circuit of tube 102, through capacitor 108, resistor 105, the upper winding of relay F, resistor 106, and the control contacts, to ground. This momentary flow of charging current for capacitor 108 causes the cathode voltage of tube 104 to be appreciably raised. In other words, the charging current of capacitor 108, when added to the existing current flow through tube 104 and the upper winding of relay F, causes such an increase of voltage at the cathode of tube 104 that the plate-cathode voltage of this tube is momentarily reduced below that required to maintain this tube in its conductive condition. Thus, the firing of tube 102 is effective in causing the other gas discharge tube 104 to be extinguished. With the lower winding of relay F now energized and the upper winding deenergized, the armature of relay F is operated to its counterclockwise position as indicated by the arrow associated with this lower winding.

In this way each application of a field station shunt causes tube 104 to fire, the upper winding of relay F to be energized, and makes gas discharge tube 102 nonconductive so as to remove the energization of the lower winding of this relay. Consequently, as indicated by the arrow associated with the upper winding of relay F, the armature is operated to its clockwise position. Similarly, the removal of a field station shunt causes tube 102 to become conductive so as to energize the lower winding of relay F, and at the same time, causes tube 104 to become nonconductive so as to remove the energization of the upper winding. The armature then assumes its counter-clockwise condition. This is the condition that the tubes 102 and 104 and also relay F assume when the system is at rest.

The time constant for the charging of capacitor 108 is made sufficiently short so that, at the end of the shortest code digit, capacitor 108 will be charged substantially to its new steady-state value. This allows the cathode of the just extinguished tube to be restored to its normal bias level in time to allow its becoming conductive again when required. This time constant is long enough, however, to maintain the cathode of the just extinguished tube position, above its normal bias voltage, for a short time so that this tube cannot become conductive in response to any extraneous input received not directly associated with the application or removal of shunt by a field station as will later be more fully explained.

When it is desired that the electronically controlled power supply reduce the line voltage in response to the detection of a field station shunt for reasons already explained, a connection is provided between the electronic impulse detector and the power supply by the closure of the push button contactor 115. The closure of this contact provides a connection between the cathode of the gas discharge tube 102 and the control grids of the rectifier tubes 29 and 30. A return connection is provided through the power supply to wire 37, thence to the impulse detector and through resistor 90 to the ground of the impulse detector.

When there is no shunt applied to the line wires, gas discharge tube 102 is in a conductive condition so that its cathode is at a positive potential with respect to ground. When the interconnection between the power supply and impulse detector is desired to be used, potentiometer 38 is initially adjusted so that, with tube 102 conductive, the desired negative bias voltage is applied to tubes 29 and 30.

In response to the application of a field station shunt, gas tube 104 is made conductive and gas tube 102 is simultaneously made nonconductive. With the cessation of plate current of tube 102, the voltage at the cathode of this tube is suddenly decreased in value. The result is to change the voltage at one terminal of the voltage divider supplying the grid voltage for tubes 29 and 30. The grid-cathode voltage of these tubes is thus reduced with the result that their rectifying action is made less effective and the output voltage is decreased.

At the conclusion of the shunt period, gas tube 102 is again made conductive with an increase in its cathode voltage. The grid-cathode voltage of tubes 29 and 30 is increased, therefore, so as to restore the output voltage of the power supply to its previous level. In this way, the output voltage of the power supply is reduced only during the time of a field station shunt and, in this way, insures the dropping away of line relays associated with field stations on branch lines.

As previously explained, it is desired that the impulse detector respond to the rise and fall of current in the line wires that occurs as code pulses are selectively applied and removed. When the above-described interconnection is provided between the impulse detector and the power supply, secondary current variations occur as a result of the variations in voltage applied to the line wires which ordinarily would result in improper operation of the impulse detector.

For example, a current increase in the line wires resulting from the application of a shunt by a field station is detected by the impulse detector with the result that gas tube 104 is fired. The drop in line voltage that is produced as the impulse detector responds to the shunt application causes the line current to be abruptly decreased. This current decrease provides an input voltage to the impulse detector of such polarity that it would ordinarily tend to make tube 102 conductive and restore tube 104 to a nonconductive condition. As already explained, however, the firing of tube 104 raises the cathode of tube 102 for a sufficiently long time that this tube cannot immediately respond to such extraneous input. This circuit means is also effective to prevent the impulse detector from responding when an increase of line voltage, occasioned by the detection of removal of shunt by a field station, has resulted in an increase of line voltage and line current.

The magnitude of the voltage drop of the output of the power supply must be sufficient to insure the dropping away of line relays on parallel lines but must not be so great as to make the detection of a shunt removal impossible. More specifically, the detection of a shunt removal by a field station occurs in response to a reduction in line current. Therefore, the power supply must provide sufficient energization of the line wires during a shunt period so that a current differential will be produced by the removal of a shunt at a field station, and in this way, make it possible for the removal of shunt to be detected at the control office.

*Embodiment of Fig. 2.*—As described in connection with Fig. 1, the control office apparatus may comprise both the electronically controlled power supply and the electronic impulse detector each shown in detail in Fig. 4. These may optionally be so cordinated, as by closure of push-button contact 115, that the line wire voltage will be reduced during the time of a field station shunt.

Figure 2:
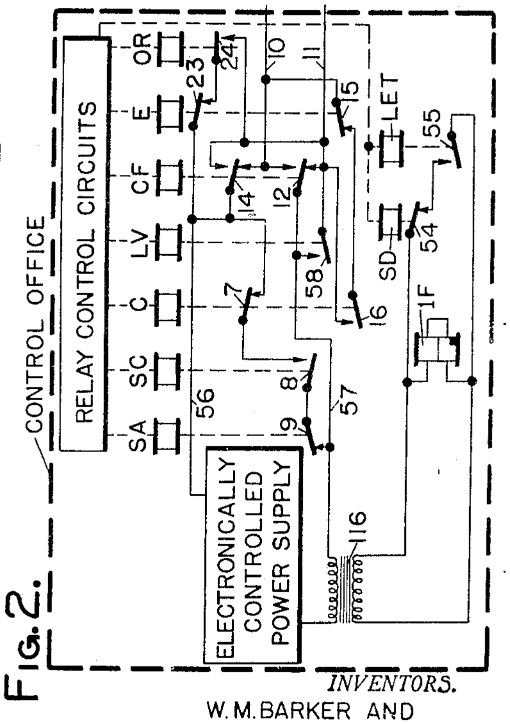
Fig. 2 illustrates control office apparatus that may be substituted for the control office apparatus included in the system of Fig. 1 comprising the electronically controlled power supply of this invention and an impulse transformer for detecting field station shunts.

Alternatively, as shown in Fig. 2, the electronically controlled power supply of this invention may be used to replace the conventional battery operated power supply, but with the conventional impulse transformer being used to provide the detection of field station codes. Thus, the electronically controlled power supply provides, as one of its features, the desired characteristic of a voltage increase with an increase in line current to provide a greater current differential through the primary winding of the impulse transformer 116 so that the relay 1F connected to the secondary winding will respond to a smaller change of loading across the line wires than is possible when a battery is employed. In this embodiment, a back contact 54 of relay SD in series with a front contact 55 of relay LET are connected across the windings of relay 1F. Thus, as with the embodiments of Figs. 1 and 3, the relay 1F is prevented from responding during the time that relay SD is dropped away and relay LET is simultaneously picked up because of this shunt on the windings of relay 1F. The control office relay circuit organization shown in this Fig. 2 is otherwise the same as shown in Fig. 1.

Figure 3:
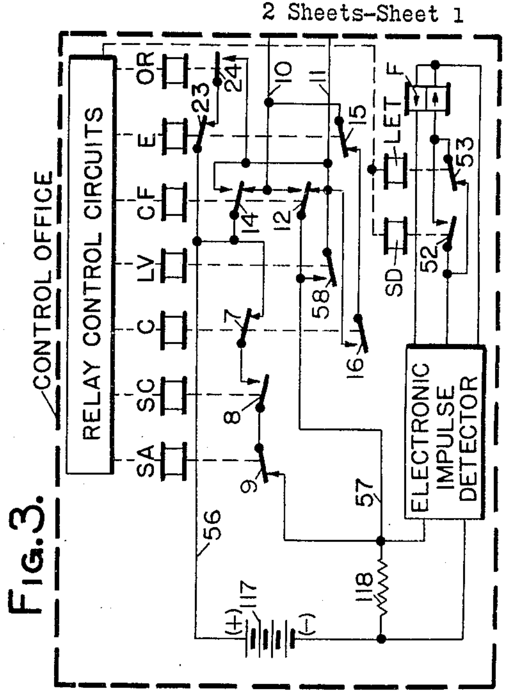
Fig. 3 illustrates another form of control office apparatus that may be substituted for the control office apparatus included in the system of Fig. 1 comprising a battery for the source of line power and the electronic impulse detector of the present invention.

*Embodiment of Fig. 3.*—As shown in Fig. 3, the electronic impulse detector may, if desired, be used also with a battery 117 as the source of line energization instead of the electronically controlled power supply. The line limiting resistor 118 connected in series with the battery limits the current that will be drawn from the battery in the event that a shunt occurs across the line wires near the control office location. As line shunts are applied and removed at the various field stations, corresponding voltage increases and decreases occur across the resistor 118, and these provide the required input for the electronic impulse detector as shown in detail in Fig. 4. The impulse detector then controls the line relay F through the control contacts as previously described. The relay circuit organization shown in Fig. 3 is otherwise the same as shown for the control office in Fig. 1.

Having described an improved control office apparatus for a centralized traffic control system as one specific embodiment of this invention, we desire it to be understood that this form is selected to facilitate in the disclosure of the invention rather than to limit the number of forms it may assume. Furthermore, various modifications, adaptations, and alterations may be applied to the specific form shown to meet the requirements of practice without in any manner departing from the spirit or scope of this invention.

What we claim is:

1. In a centralized traffic control system for railroads, a pair of line wires connecting a control office to a plurality of field stations, line energizing means at said control office for applying direct current to said line wires, a resistor in series with said line energizing means, means at said control office and at each of said field stations for causing the current in said line wires to be alternately increased and decreased according to a distinctive code pattern, an electronic impulse detector at said control office comprising a push-pull amplifier having the voltage across said resistor applied to it as an input signal, said impulse detector comprising two gas discharge tubes, one of said gas discharge tubes being made conductive when the current in said line wires is increased and the other being made conductive when the current in said line wires is decreased, tube extinguishing means associated with said gas discharge tubes and being effective in response to the firing of one of said tubes to cause the other of said tubes to be extinguished, said extinguishing means being effective for a limited time following the firing of one of said tubes to prevent the other of said tubes from becoming conductive, whereby extraneous inputs to said amplifier not associated with the application and removal of a code pulse to said line wires are not effective on said impulse detector.

2. In a direct current shunt type of code communication system, a pair of line wires connecting a control office to a plurality of field stations, power supply means at said control office for energizing said line wires, a line relay at each field station connected across said line wires, circuit means at each field station for intermittently shunting said line wires to provide code pulses having a distinctive code pattern representing information to be transmitted to said control office, an impulse detector at said control office being successively operated between opposite conditions in response to the application and removal of said code pulses, and circuit means governed by said impulse detector and effective on said power supply means to cause the voltage applied to said line wires to be reduced throughout the duration of each of said code pulses to thereby cause said line relays at the various field stations to be released during the time of each of said code pulses.

3. In a centralized traffic control system for railroads, a pair of line wires connecting a control office to a plurality of field stations, an electronic power supply at said control office normally energizing said line wires with direct-current power, means at each of said field stations for selectively shunting said line wires to produce distinctive code pulses on said line wires, an impulse transformer having its primary winding connected in series with said line wires, an electromagnetic device connected across a secondary winding of said transformer for detecting the presence of said code pulses, and circuit means connected to said power supply and responsive to the current supplied to said line wires for varying the voltage applied to said line wires in the same direction as said line current varies to thereby increase the current differential in said primary winding as said line wires are alternately shunted and unshunted.

4. In a centralized traffic control system for railroads, a pair of line wires connecting a control office to a plurality of field stations, means at said control office and at each field station for causing pulses of direct current to be applied to said line wires in a distinctive code pattern representing information to be transmitted, an electronic impulse detector at said control office comprising an amplifier being responsive to the changes of current in said line wires, a first and second gas discharge tube, said first gas discharge tube being made conductive when a shunt is applied to said line wires, said second gas discharge tube being made conductive when said shunt is removed from said line wires, means responsive to the firing of either of said gas discharge tubes for making the other of said gas discharge tubes nonconductive, and means effective throughout the time said first gas discharge tube is conductive to cause the voltage applied to said line wires to be reduced.

5. In a centralized traffic control system for railroads, a pair of line wires connecting a control office to a plurality of field stations, an electronic power supply at said control office for energizing said line wires with direct-current power, means at each of said field stations for selectively shunting and non-shunting said line wires to produce distinctive code pulses on said line wires, impulse detection means at said control office being responsive to abrupt changes in current in said line wires for detecting the presence of said code pulses, and circuit means connected to said electronic power supply and responsive to the current supplied to said line wires for varying the voltage applied to said line wires in the same direction as said line current varies, whereby the current differential in said line wires between the shunt and non-shunt conditions is increased to facilitate the detection of said code pulses by said impulse detection means.

6. In a centralized traffic control system for railroads, a pair of line wires connecting a control office with a plurality of field stations, an electronic power supply at said control office having an adjustable voltage output for energizing said line wires with direct current power, a line relay at each field station connected across said line wires, means at each of said field stations at times operable for selectively shunting and non-shunting said line wires to produce distinctive code pulses on said line wires, impulse detection means at said control office being successively operative between opposite conditions in response to the application of said shunt and non-shunt conditions at the field stations, and circuit means governed by said impulse detection means after the initial detection of each shunt condition to act on said adjustable electronic power supply to cause the voltage applied to said line wires to be reduced throughout the remainder of that shunt condition for a code pulse thereby additionally tending to release said line relays at the various field stations during the time of each of said shunt conditions.

References Cited in the file of this patent

UNITED STATES PATENTS

| | | |
|---|---|---|
| 712,639 | Berg | Nov. 4, 1902 |
| 1,479,561 | Stoekle | Jan. 1, 1924 |
| 1,514,753 | Wold | Nov. 11, 1924 |
| 1,823,739 | Horton | Sept. 15, 1931 |
| 2,171,614 | Wendt | Sept. 5, 1939 |
| 2,210,732 | Rumpel | Aug. 6, 1940 |
| 2,321,618 | Potts | June 15, 1943 |
| 2,348,555 | Mathes | May 9, 1944 |
| 2,399,734 | Hailes | May 7, 1946 |
| 2,549,667 | Cosby | Apr. 17, 1951 |
| 2,580,155 | Brannen | Dec. 25, 1951 |
| 2,762,038 | Lubkin | Sept. 4, 1956 |
| 2,819,410 | Haner | Jan. 7, 1958 |